United States Patent [19]
Chadha et al.

[11] Patent Number: 5,706,495
[45] Date of Patent: Jan. 6, 1998

[54] ENCODED-VECTOR INDICES FOR DECISION SUPPORT AND WAREHOUSING

[75] Inventors: Atul Chadha, Milpitas; Ashish Gupta, Saratoga; Piyush Goel, Monte Sereno; Venkatesh Harinarayan, Stanford; Balakrishna Raghavendra Iyer, San Jose, all of Calif.

[73] Assignee: International Business Machines Corporation, Armonk, N.Y.

[21] Appl. No.: 643,998

[22] Filed: May 7, 1996

[51] Int. Cl.$^6$ .................................................. G06F 17/30
[52] U.S. Cl. ........................................... 395/602; 395/603
[58] Field of Search ................................. 395/602, 601, 395/603

[56] References Cited

U.S. PATENT DOCUMENTS

| | | | |
|---|---|---|---|
| 5,105,353 | 4/1992 | Charles et al. | 395/700 |
| 5,293,616 | 3/1994 | Flint | 395/600 |
| 5,495,608 | 2/1996 | Autoshenkov | 395/603 |
| 5,560,007 | 9/1996 | Thai | 395/603 |

OTHER PUBLICATIONS

"Decision Support viewpoint: An Enterprise-wide Data Delivery Architecture," brochure, Microstrategy Incorporated, Vienna, VA, 1994, pp. 1–15.

"An Introduction to Multidimensional Database Technology," brochure, Kenan Technologies, Kenan Systems Corporation, Cambridge, MA, 1994, pp. 1–28.

"Red Brick High–Speed Query Accelerator of its Own," Computergram International, Dec. 15, 1994, (ISSN:0268–716x).

A. Shoshani. Statistical Databases: Characteristics, Problems and Some Solutions. *Proceedings of the Eighth International Conference on Very Large Databases (VLDB)*, pp. 208–222, 1982.

RELease 1.0, v91, n2, p1–27, Feb. 25, 1991 (ISSN: 0740–935x).

Chang, W. Soliman, H.S. Sung, A.H., "Image Data Compression Using Counterpropagation Network," *1992 IEEE International Conference on Systems, Man and Cybernetics*, (cat. No. 92CH3176–5) Oct. 18–21, 1992, pp. 405–409 vol. 1.

Frisch, Joseph, "Bit Vectors Vitalize Data Retrieval," *Data Processing Magazine's Data Dynamics*, vol. 13, No. 8 pp. 37–41, Aug./Sep. 1971.

Jackobsson, M., "Implementation of Comprssed Bit–Vector Indexes," *Furo IFIP 79*, North Holland Publishing Company, 1979, pp. 561–566.

Kimball, Ralph and Strehlo, Kevin, "Why Decision Support Fails and How to Fix it," *Datamation*, Jun. 1, 1994, pp. 40–45.

Marshall, Martin, "Data Warehouse Update to Include Bit–Mapped Indexing," *CommunicationsWeek*, No. 585, Nov. 20, 1995, p. 5.

Phillips, Ben, "Red Brick Props up Flagship Foundation," *PC Week*, vol. 12, No. 47, p. 45, Nov. 17, 1995.

"Multidimensional Analysis: Converting Corporation Data into Strategic Information," Arbor Software Corporation, Sunnyvale, CA.

(List continued on next page.)

*Primary Examiner*—Paul V. Kulik
*Attorney, Agent, or Firm*—Merchant, Gould, Smith, Edell, Welter & Schmidt

[57] ABSTRACT

A method, apparatus, and article of manufacture for optimizing SQL queries in a relational database management system using a vectorized index. The vectorized index represents values in one or more of the columns of a particular table in the relational database. The vectorized index is comprised of a plurality of positions, wherein each of the positions comprises a linear array that represents a value for the specified columns in a corresponding row of the particular table in the relational database. To use the vectorized index, SQL operations are converted to a series of bit-vector operations on that index, where the result of the bit-vector operations is a list of row positions in the table.

72 Claims, 13 Drawing Sheets

OTHER PUBLICATIONS

J. Gray, A. Bosworth, A. Layaman and H. Pirahesh, "Data Cube: Relational Operator Generalizing Group–By, Cross–Tabs and Sub–Totals," *IEEE*, 1996, pp. 152–159.

Sybase's Fast Projection Index, "Faster Data Warehouses: New Tools Provide High Performance Querying through Advanced Indexing," InformationWeek Dec. 4, 1995, p. 77. ISSN: 8750–6874.

E.F. Codd, "Providing OLAP (On–line Analytical Processing) to User–Analysts: An IT Mandate,"E.F. Codd and Associates, 1993.

"Decision Support Viewpoint: The Case for Relational OLAP," MicroStrategy, Inc, Vienna, Virginia, 1995, pp. 1–20.

ENCODED-VECTOR INDICES FOR DECISION SUPPORT AND WAREHOUSING

BACKGROUND OF THE INVENTION

1. Field of the Invention

This invention relates in general to database management systems performed by computers, and in particular, to the optimization of SQL queries in a relational database management system using a vectorized index and orthogonal encodings for the index.

2. Description of Related Art

Relational DataBase Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

Warehousing and decision support have become two of the most important areas for the use of SQL and relational databases. Warehousing and decision support need a query-browse interaction paradigm that enables an analyst to pose complicated queries and receive quick answers, based on which the analyst forms a decision. Answers are expected quickly because the system is used interactively. It is commonly believed that this interaction is different from the online transaction processing (OLTP) interaction of traditional RDBMS.

Multi-dimensional database management systems (MDDBMS) have been proposed to allow a user to easily express complex queries and to have the system efficiently execute the queries. MDDBMS have different functionality than current RDBMS and are better for business analysis queries because they use a different model of data, one that is closer to the business analysts' view of the world and that provides the correct level of abstraction for viewing and querying the data. See, e.g., E. F. Codd, "Providing OLAP (On-line Analytical Processing) to User-Analysts: An IT Mandate", E. F. Codd and Associates, 1993, hereinafter referred to as [Cod93]; "An introduction to multidimensional database technology", Kenan Technologies, Kenan Systems Corporation, One Main Street, Cambridge, Mass. 02142, hereinafter referred to as [Ken]; and R. Kimball and K. Strehlo, "What's wrong with SQL", Datamation, June 1994, hereinafter referred to as [KS94]; all of which publications are incorporated by reference herein.

Thus, MDDBMS are very useful for online analytical processing (OLAP) applications. The usefulness of multi-dimensional view of data has also been advocated in the statistical database literature for more than a decade. See, e.g., A. Shoshani, "Statistical Database: Characteristics, Problems and some Solutions", Proceedings of the Eighth International Conference on Very Large Databases (VLDB), pages 208–213, 1982, hereinafter referred to as [Sho82], and incorporated by reference herein.

The data view supported by MDDBMS, and acknowledged to be useful by technology observers like the Gartner group and actual users in companies like IBM, is that data can be accessed by arbitrary combinations of some of the attributes present in a table.

This is best illustrated by example. Consider a relational database schema that is defined as follows:

LINEITEM(PARTKEY,SUPPKEY,QUANTITY, SHIPDATE)

PART(PARTKEY,NAME,MFGR)

SUPP(SUPPKEY,NAME,ADDR)

The LINEITEM table is very large and it has foreign key accesses (PARTKEY, SUPPKEY) into the other tables. The tables PART and SUPP provide details for parts and suppliers. The schema shown above is a "star schema," where there is one very large "mother" table and many small detail tables.

To answer queries, the detail tables frequently have to be joined with the mother table. Queries typically involve selections on the attributes of the detail tables, e.g. suppliers in California. Subsequently, information for the selected tuples needs to be fetched from the mother table, e.g. the parts and their quantities shipped by these suppliers.

It has been empirically verified that the fastest way of answering such queries is to take a cross product of the tuples in the detail tables that satisfy the selection conditions and then use their keys to lookup the joining tuples from the mother table. Thus, the mother table needs to have indices on the foreign keys' attributes to allow the joining tuples to be found via indexed lookups rather than a full scan. Note that selections may be on an arbitrary number of detail tables, thereby requiring indices on arbitrary combinations of the foreign keys' attributes of the mother table. Even in non-star schemas, decision support necessitates the ability to efficiently answer queries that filter on an arbitrary combination of attributes.

Thus, one of the important problems encountered in decision support and data warehousing applications is to answer queries efficiently using arbitrary sets of attributes for filtering, i.e. all attributes should be treated symmetrically with respect to querying.

Another frequent way of analyzing data is to define hierarchies on the data and then pose aggregate queries. Thus, parts may be divided into groups depending on the there use in machines. Further, these machines may be divided into groups based on the industry that purchases them. Note that a part may be used in multiple machines and a machine may be used in multiple industries. The groupings "PARTKEY → machine → industry" is a hierarchy on the attribute PARTKEY. Similarly, suppliers may be grouped by the geographical region in which they are located and the geographical regions grouped by states (or country). Thus, the hierarchy "SUPPKEY → region → country" may be defined on the attribute SUPPKEY.

Analysts frequently aggregate base data to find information at higher levels of the attribute hierarchies. Thus, an analyst might want the total quantity of a particular part sold in Canada. Such queries need to be efficiently supported by the access method of choice. In general, aggregations may not only be along pre-specified hierarchies.

To satisfy the requirement of efficiently querying on arbitrary attributes, one option is to maintain indices on all possible combinations of all filterable attributes. However, this is not a feasible solution because it is too space intensive.

The requirements of the access method/indexing technique are:

- symmetric treatment of all attributes;
- aggregation along dynamic and static hierarchies;
- compact representation of indices; and
- efficient answering of various types of queries like point and range selections, multi-attribute selections, joins, and aggregations.

In the prior art, new access methods have been proposed. Some vendors have proprietary multi-dimensional data structures. See, e.g., "Multidimensional Analysis: Converting Corporate Data into Strategic Information", Arbor Software Corporation, 1325 Chesapeake Terrace, Sunnyvale, Calif. 94108, hereinafter referred to as [Arbor], which publication is incorporated by reference herein. Other vendors, like ORACLE and SYBASE, have suggested and/or provided bit-mapped indexing techniques. Nonetheless, there is still a need in the art for enhanced access methods and structures.

SUMMARY OF THE INVENTION

To overcome the limitations in the prior art described above, and to overcome other limitations that will become apparent upon reading and understanding the present specification, the present invention discloses a method, apparatus, and article of manufacture for optimizing SQL queries in a relational database management system using a vectorized index. The vectorized index represents values in one or more of the columns of a particular table in the relational database. The vectorized index is comprised of a plurality of positions, wherein each of the positions comprises a linear array that represents a value for the specified columns in a corresponding row of the particular table in the relational database. To use the vectorized index, SQL operations are converted to a series of bit-vector operations on that index, where the result of the bit-vector operations is a list of row positions in the table.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
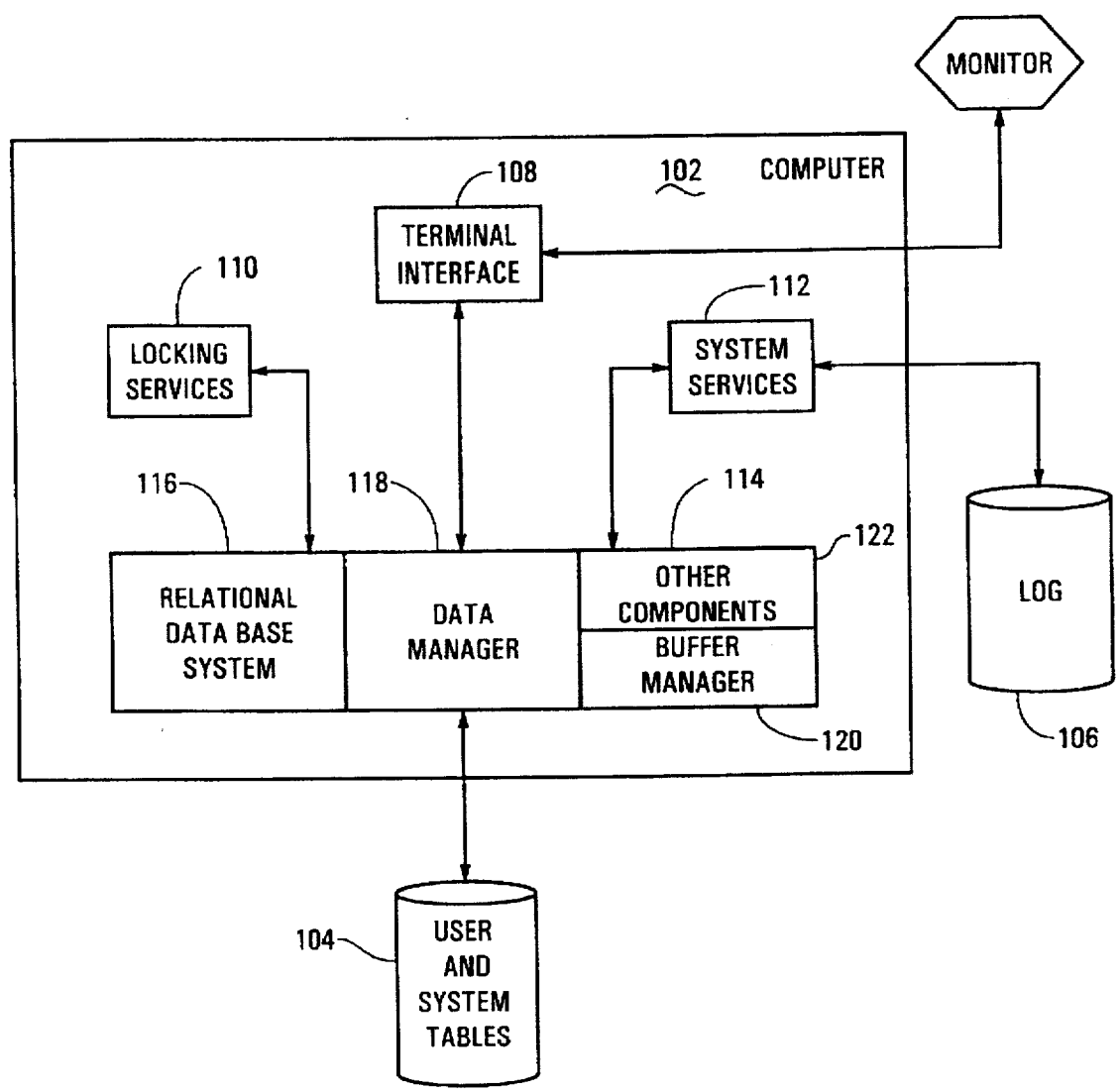
FIG. 1 illustrates an exemplary computer hardware environment that could be used with the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

DEFINITIONS

Following are definitions for a number of terms used in SQL queries and relational databases. These definitions are required for an understanding of later portions of the present specification.

Tuple or Relation

A tuple or relation is a row in a table of a relational database.

Attribute

An attribute is a field or column of a table of a relational database.

Keys

A key for a derived or base table is a minimal set of columns that can uniquely determine a tuple in the table. That is, given two tuples with the same values on the key columns, the data values of the other non-key columns of these two tuples must be the same. Note that this definition does not preclude having null values in the key column(s). For example, the primary key of a base table is a key. Also, given a unique index on one or more columns, the set of indexed columns form a key of the table.

SELECT Statement

In the SQL standard, the SELECT statement generally comprises the format: "SELECT <clause> FROM <clause> WHERE <clause> GROUP BY <clause> HAVING <clause> ORDER BY <clause>." The clauses generally must follow this sequence, but only the SELECT and FROM clauses are required. The result of a SELECT statement is a subset of data retrieved by the RDBMS software from one or more existing tables or views stored in the relational database, wherein the FROM clause tells the RDBMS software the name of the table or view from which data is being selected. The subset of data is treated as a new table, termed the result table, which typically comprises a temporary table. In general, the items specified in the SELECT clause of the SELECT statement determine the columns that will be returned in the result table from the table(s) identified in the FROM clause.

WHERE Clause

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specify a comparison between two values comprising columns, constants or correlated values. Multiple predicates in the WHERE clause are themselves typically connected by Boolean operators.

GROUP BY Clause

The GROUP BY clause is an optional clause in a SELECT statement that causes the rows into intermediate result set to be grouped according to the values and columns specified in the GROUP BY clause. The GROUP BY clause follows the WHERE clause, if there is one, and is most commonly used when the SELECT statement contains one or more column functions.

ORDER BY Clause

The ORDER BY clause is an optional clause in a SELECT statement that returns the rows of the result table in the order of the column specified, wherein the default is ascending order. More than one column may be specified for the ORDER BY clause.

Join Operation

A join operation makes it possible to combine tables or views by combining rows from one table or view to another table or view. The rows, or portions of rows, from the different tables or views are concatenated horizontally. The join operation is usually implied by naming more than one table or view in the FROM clause of a SELECT statement. Although not required, join operations normally include a WHERE clause that identifies the columns through which the rows can be combined. The WHERE clause may also include a predicate comprising one or more conditional operators that are used to select the rows to be joined.

Nested-Loop Join

In a Nested-Loop Join, a row is retrieved from one table (the outer table) and then the second table (the inner table) is scanned for rows that should be joined to the outer table row. The next row is then retrieved from the outer table and the entire inner table is scanned again for joinable rows.

Sort Merge Join

In a Sort Merge Join, a sort may be invoked by a join to specify that data be retrieved in a certain order, as with the ORDER BY, GROUP BY and SELECT clauses. Thereafter, both the inner and outer tables are in the same order based on the columns through which the tables are being joined. The access method is similar to the Nested-Loop Join, but since both tables are sorted, the inner table does not have to be scanned from the beginning for every qualified row in the outer table, but can be scanned from the current position.

ENVIRONMENT

FIG. 1 illustrates an exemplary computer hardware environment that could be used with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Figure 2:
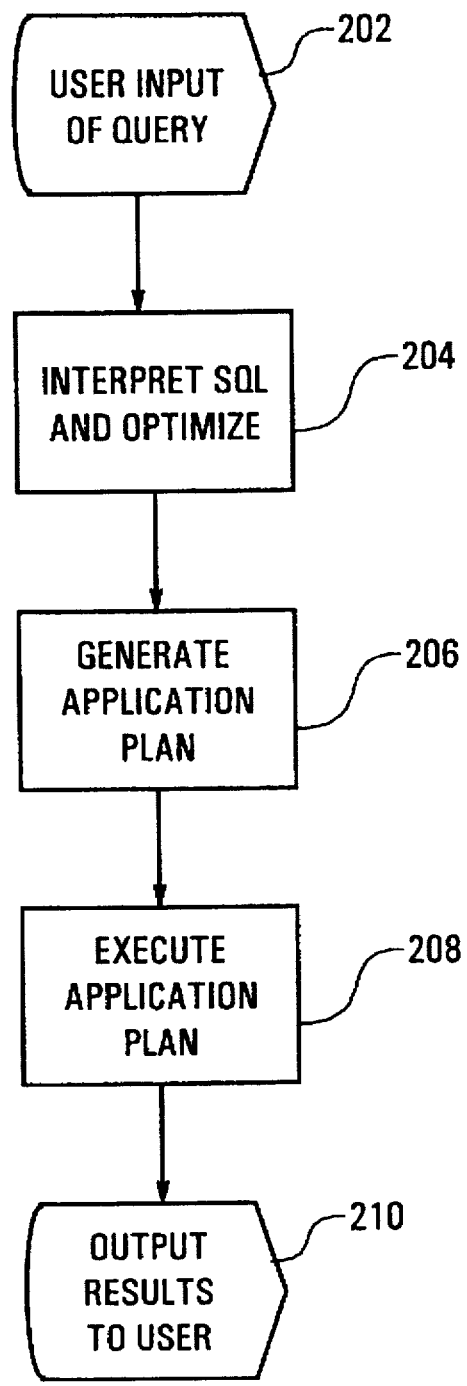
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
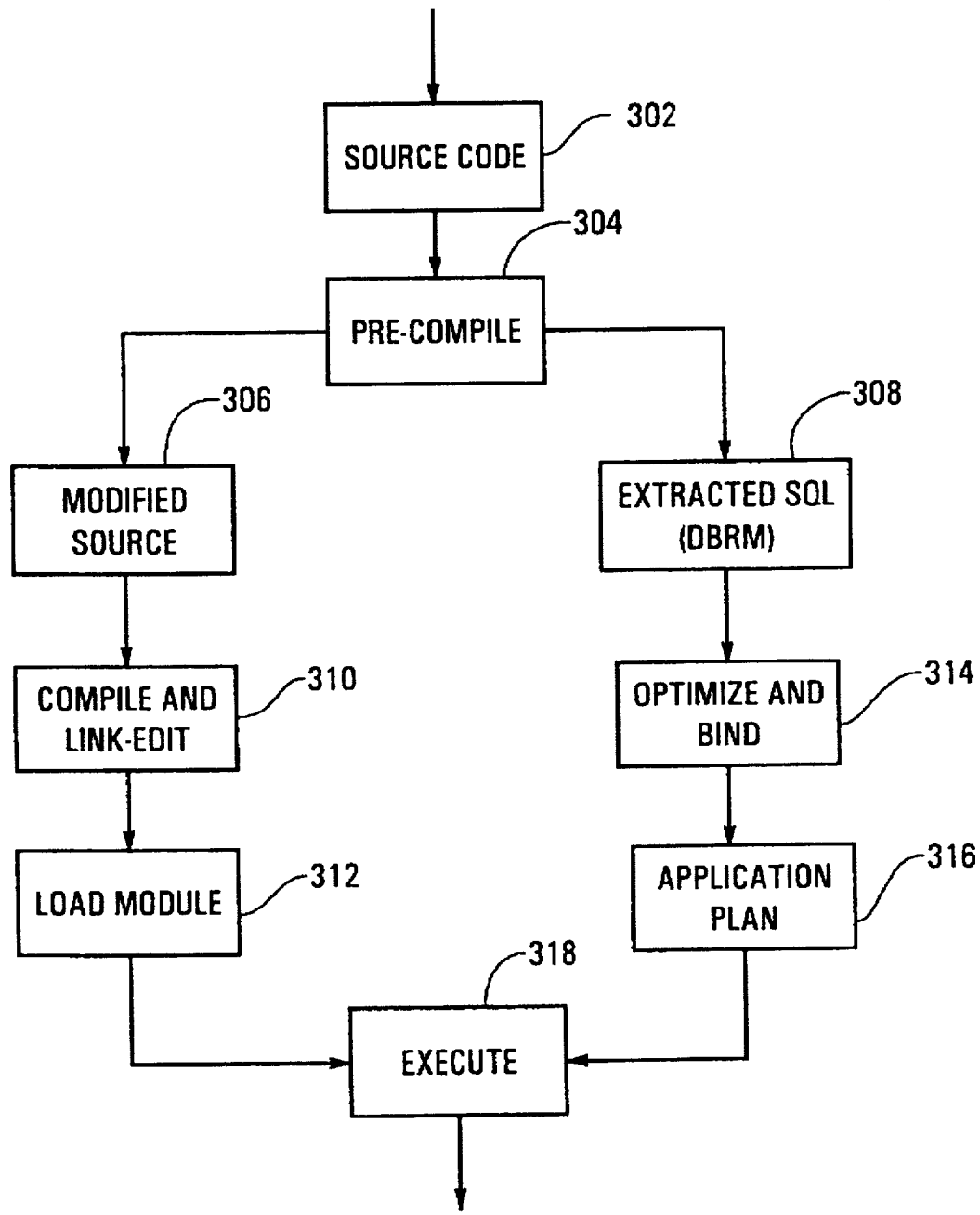
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

AN ENCODED VECTORIZED INDEX

The present invention comprises a vectorized index technique that efficiently supports SQL operations on relational databases. In this disclosure, a number of aspects of the invention are discussed including the proposed vectorized index, an encoding technique for the vectorized index, a method for updating the index when insertions and/or deletions are made to the underlying table, and a method for efficiently performing selections and joins using the index.

Consider the LINEITEM table and let the attributes PARTKEY, SUPPKEY, and SHIPDATE be filterable, i.e. queries impose conditions on these attributes. The present invention can be illustrated using only the PARTKEY attribute. Note that one index is maintained for each attribute, and that indices on multiple attributes are not needed.

An active domain of an attribute, e.g. PARTKEY, in a given relation, e.g. LINEITEM, is the set of all distinct values of the attribute that occur in the table. For instance, the active domain of PARTKEY in LINEITEM can be computed by the query:

SELECT DISTINCT PARTKEY FROM LINEITEM

The first assumption needs to hold for the technique to function. The other two assumptions determine the efficiency of the proposed indexing technique.

1. Each tuple in a relation has a fixed position and the position can be used to uniquely identify the tuple. For example, the second tuple is a well defined concept.
2. Bit operations are efficiently executable. That is, "bit-AND," "bit-OR," "bit-XOR" may be executed very fast.
3. The active domain is substantially smaller than the number of rows in the relation.

In the preferred embodiment, the vectorized index is comprised of a plurality of positions, wherein each of the positions comprises a linear array that represents a value for the specified columns in a corresponding row of the particular table in the relational database. More specifically, the vectorized index comprises a vector of |R|*K bits wherein |R| is a count of rows in the specified table, K is CEILING (LOG(N)), N is a count of unique values in an active domain for the specified columns, and CEILING() is a ceiling function that returns the next highest integer value for LOG(N). Once constructed, queries may be performed using the vectorized index, wherein each respective K bits from the vectorized index represent a value for the specified column in a corresponding row of the table. Using the vectorized index, a query is converted into a series of bit-vector operations on that index where the result of the bit-vector operations is a list of row positions in the table.

CONSTRUCTING AN ENCODED VECTORIZED INDEX

Figure 4:
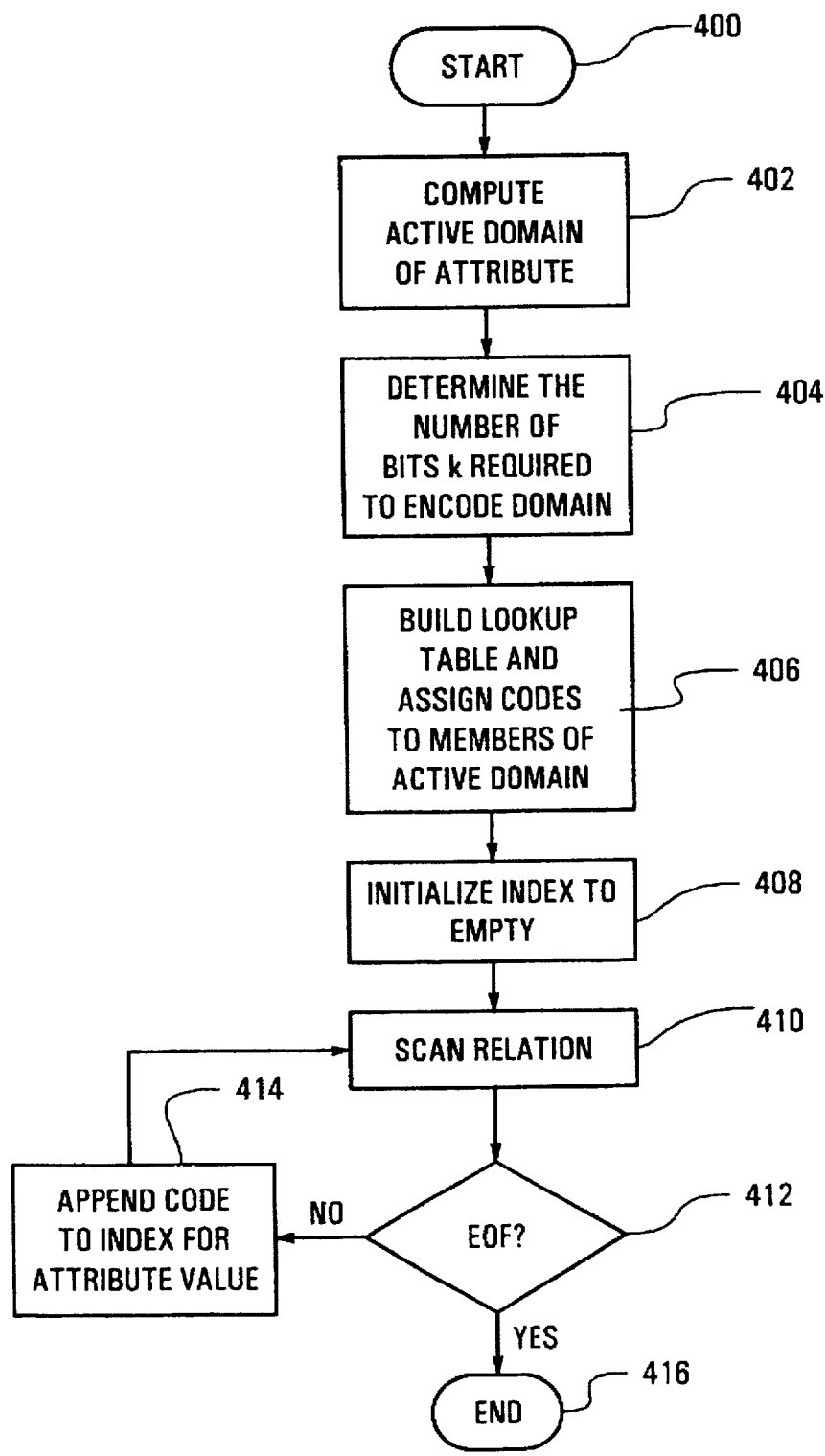
FIG. 4 is a flowchart illustrating the logic performed by the computer system to construct a vectorized index for an attribute according to the present invention.

FIG. 4 is a flowchart illustrating the logic performed by the computer system to construct an encoded vectorized index for an attribute according to the present invention. In this example, an index is constructed for an attribute or column labeled PARTKEY. Block 400 represents the start of the logic. Block 402 represents the system determining the active domain of the attribute, wherein the set of values in the active domain is labeled D. Block 404 represents the system determining the number of bits K required to encode the set of values in the active domain, wherein N is the number of unique values in the active domain, K comprises CEILING(LOG(N)), and CEILING() indicates a ceiling function that returns the next highest integer value for LOG(N). Block 406 represents the system building a lookup table for the index, wherein the lookup table provides a mapping between each value in the active domain and a unique K-bit code representing that value. Block 408 represents the system initializing an encoded vector index, labeled I(PARTKEY), for the attribute to an empty set. Block 410 represents the system scanning the next relation, i.e. row, of the table. Block 412 is a decision block that represents the system determining if an end-of-file (EOF) has occurred on the scan. If not, control transfers to Block 414, which represents the system appending the code from the lookup table associated with the particular attribute value in the retrieved row to the encoded vector index and then returning to Block 410 to retrieve the next row. Otherwise, control transfers to Block 416 to end the logic, wherein Block 416 also represents the system storing the encoded vectorized index on one or more of the data storage devices 104 and/or 106.

Thus, the encoded vectorized index for attribute PARTKEY in relation LINEITEM is a string of K * |R| bits, wherein |R| is number of tuples in the table, the first K bits represent the value of attribute PARTKEY in the first tuple of LINEITEM, the second K bits represent the value of attribute PARTKEY in the second tuple of LINEITEM, and so on. Note that the present application does not describe how to assign the codes to the active domain. Many alternative ways are possible, and the advantages of some of them are outlined later in this disclosure.

Insertions

If the insertions are such that the new active domain can be represented by codes of the same length as before, which is an argument for having a slightly larger code space than absolutely necessary to fit the initial data, and then batch inserts are appended to the end of the table and the encoded vectorized index for the appended portion is appended to the old index. Note that the lookup table will have to be extended to include the new values of the active domain.

If the new insertions cannot be represented by codes of the same length, then new codes of length $\lceil \log N' \rceil$ are assigned to each new member and a new encoded vectorized index is built for the new insertions, wherein N' is the number of unique new members estimated to be inserted in the dimension. Also, to facilitate efficient processing of range queries, a radix structure of depth $\lfloor \log N \rfloor$ is built, wherein N is the number of members in the old active domain.

This structure allows new members to be found for range queries. For example, if the given range is $[a_1, a_2]$, then the new members in this interval are found by traversing the radix structure with the code for $a_1$. Eventually, the new members are found at the leaf nodes.

Note that the processing of point and range queries have to be extended in order to include the new encoded vectorized index. Also, note that any number of new insertions can be handled by the scheme described above.

Updates

Updates to the table are implemented by updating the encoded vectorized indices. The updates to members of the active domain are implemented by re-assigning codes to the new members.

Deletions

Deletions to the table are implemented by assigning a special code to the deleted tuples in the encoded vectorized indices. This special code implies that the corresponding tuples are not present in the tables.

RELATIONAL OPERATIONS USING AN ENCODED VECTORIZED INDEX

In this section, the specification describes how to implement three kinds of relational operations using an encoded vectorized index. The basic idea for using the indices is to convert a relational query into a series of bit-vector operations. The result of the bit-vector operations is a list of tuple positions (or offsets) in the relation(s) being queried. Thus, to obtain the final result, the relation(s) need to be accessed to retrieve all the tuples of interest (that are identified by their positions).

Point Queries on a Single Attribute

Figure 5:
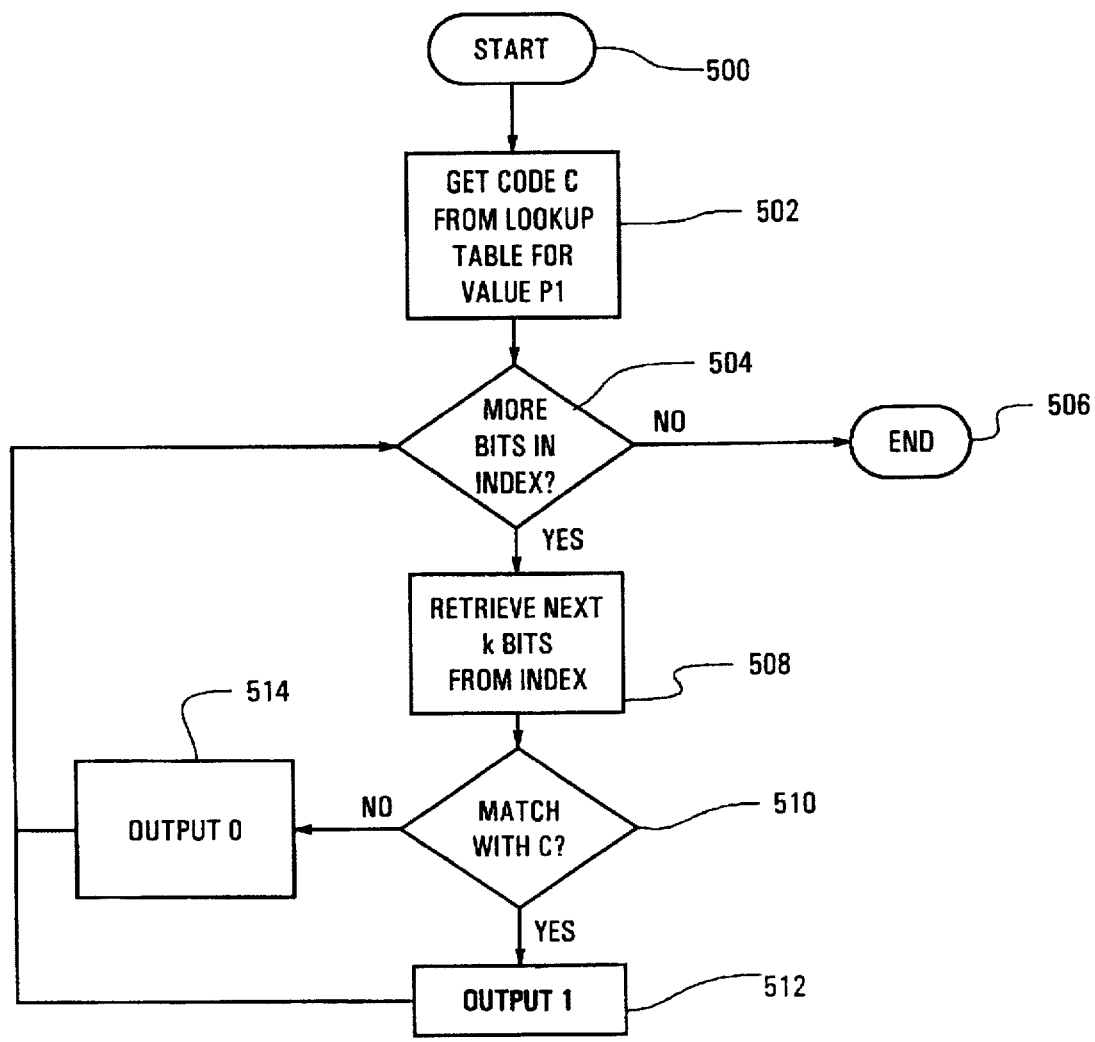
FIG. 5 is a flowchart illustrating the logic performed by the computer system to execute a point query on a single attribute using the vectorized index for the attribute according to the present invention.

FIG. 5 is a flowchart illustrating the logic performed by the computer system to execute a point query on a single attribute using the encoded vector index for the attribute according to the present invention. In this example, queries take the form:

SELECT * FROM LINEITEM WHERE PARTKEY=P1.

Such queries can be answered using the encoded vector index represented by I(PARTKEY).

Block 500 represents the start of the logic. Block 502 represents the system retrieving the code C from the lookup table, wherein the code C corresponds to a value P1. Block 504 is a decision block that represents the system determining if there are more bits in the index. If not, control transfers to Block 506 which ends the logic; otherwise, control transfers to Block 508. Block 508 represents the system retrieving the next K bits from the index, starting from the current position within the index and advancing the current position by K bits. Block 510 is a decision block that represents the system determining if the K bits match the code C from the lookup table for value P1. If so, control transfers to the Block 512, which represents the system outputting a value 1; otherwise, control transfers to Block 514, which represents the system outputting a value zero. In both cases, control thereafter returns to Block 504 to continue retrieving bits from the index, until the index has been completely reviewed.

The logic of FIG. 5 is referred to as a Single Index value Match Routine (SIMR). The result of SIMR is a vector of |R| bits where the Ith bit is '1' if the Ith tuple in LINEITEM satisfies PARTKEY=P1.

Matching Equi-Length Bit Vectors

Figure 6:
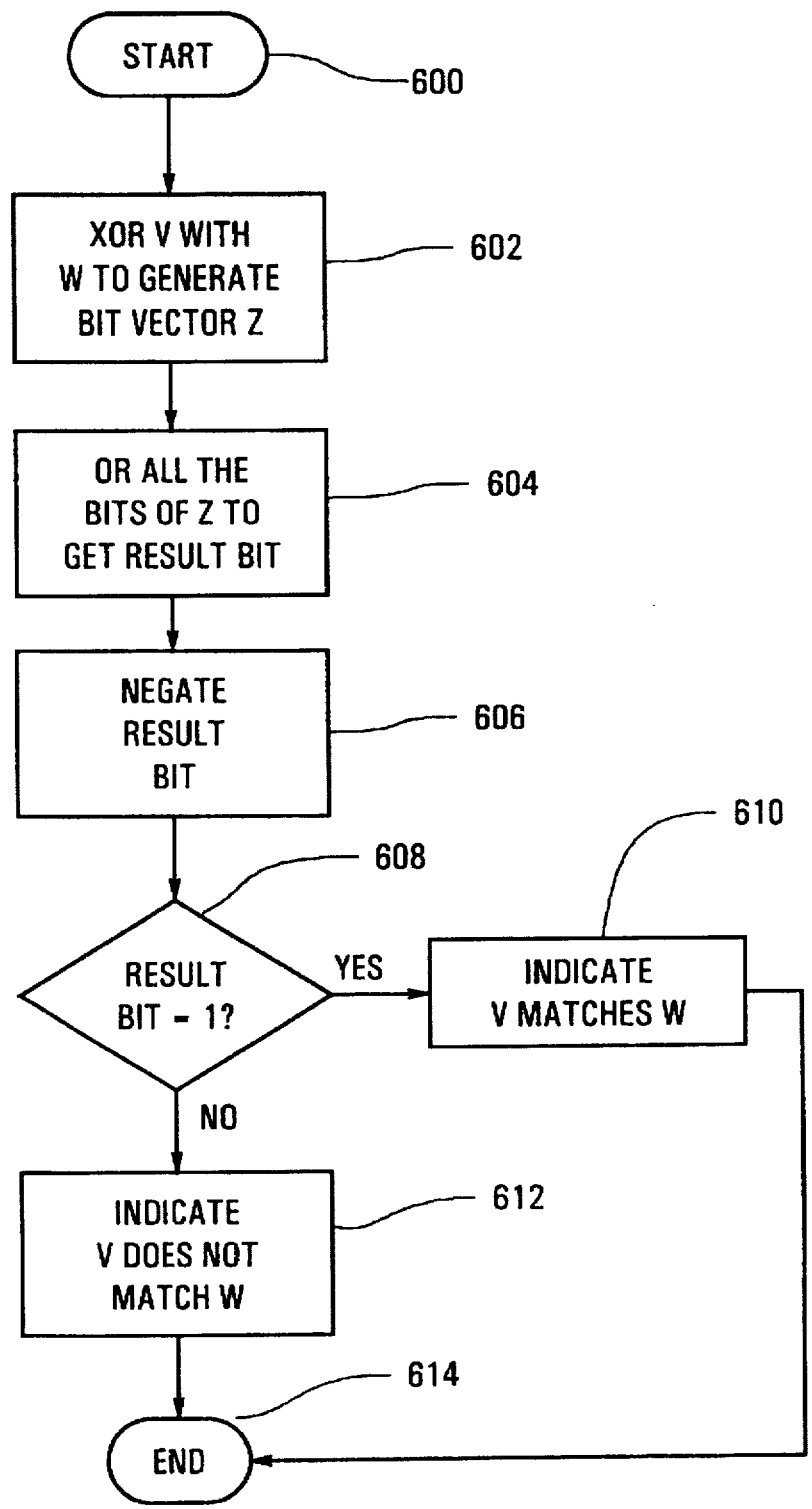
FIG. 6 is a flowchart illustrating the logic performed by the computer system to determine whether to equi-length bit vectors V and W match according to the present invention.

Note that SIMR needs to determine whether two equi-length bit vectors V and W match. The logic for performing this function, which can be efficiently supported in hardware, is illustrated in FIG. 6. FIG. 6 is a flowchart illustrating the logic performed by the computer system to determine whether to equi-length bit vectors V and W match according to the present invention. Block 600 represents the startup logic. Block 602 represents the system performing an XOR operation of V with W to generate a resulting bit vector Z. Block 604 represents the system performing an OR operation on all of the bits of Z to generate a single result bit. Block 606 represents the system negating the single result bit. Block 608 is a decision block that represents the system determining whether the result bit has value of 1. If so, control transfers to Block 610, which represents the system indicating that the V matches W; otherwise, control transfers to Block 612, which represents the system indicating that V does not match W. In both cases, control thereafter transfers to Block 614 which ends the logic.

Point Queries on Multiple Attributes

Figure 7:
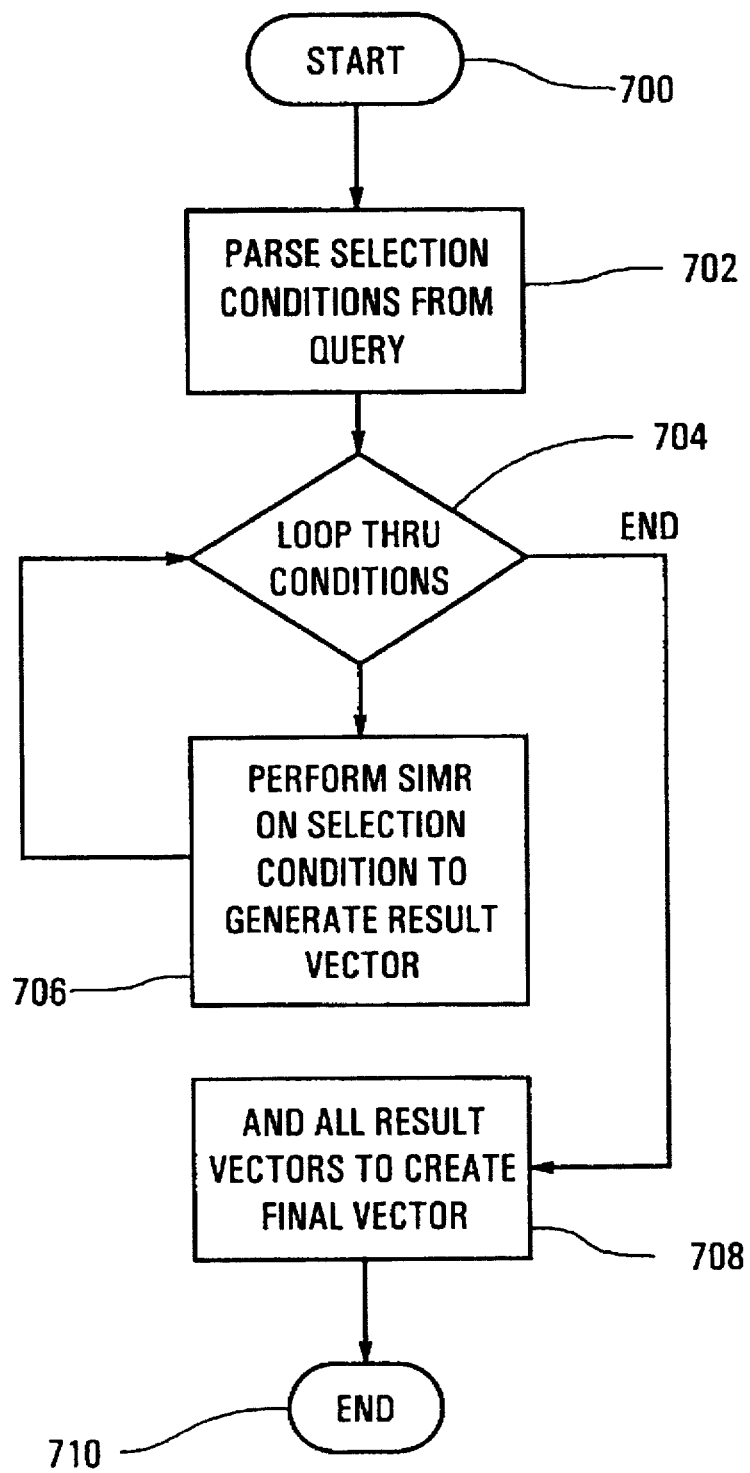
FIG. 7 is a flowchart illustrating the logic performed by the computer system to execute a point query on multiple attributes using a vectorized index for the attributes according to the present invention.

FIG. 7 is a flowchart illustrating the logic performed by the computer system to execute a point query on multiple attributes using encoded vector indices for the attributes according to the present invention. In this logic, the query is posed on a single table and involves a conjunction of multiple equality-based selection conditions on one or more attributes of the relation, i.e., $S_1, \ldots, S_M$. Note that encoded vectorized indices are assumed to exist on all the selected attributes.

Block 700 represents the start of the logic. Block 702 represents the system parsing the query to identify M selection conditions. Block 704 represents the computer performing a looped process each of the M selection conditions in the query. Block 706 represents the computer performing the SIMR on each selection condition to generate a result bit vector of length |R| bits, wherein the Ith bit vector $V_i$ indicates the tuples satisfying the selection condition $S_i$. After all the selection conditions have be processed within the loop, control transfers to Block 708. Block 708 represents the computer performing an AND operation on the M result vectors to create a final vector of length |R| that indicates the positions of all tuples that satisfy all selection conditions. Control then transfers to Block 710 to end the logic. Note that if the query uses conjunctions and disjunctions, then the above logic would accordingly perform "AND" and "OR" operations on the resulting vectors.

Range Queries on a Single Attribute

Figure 8:
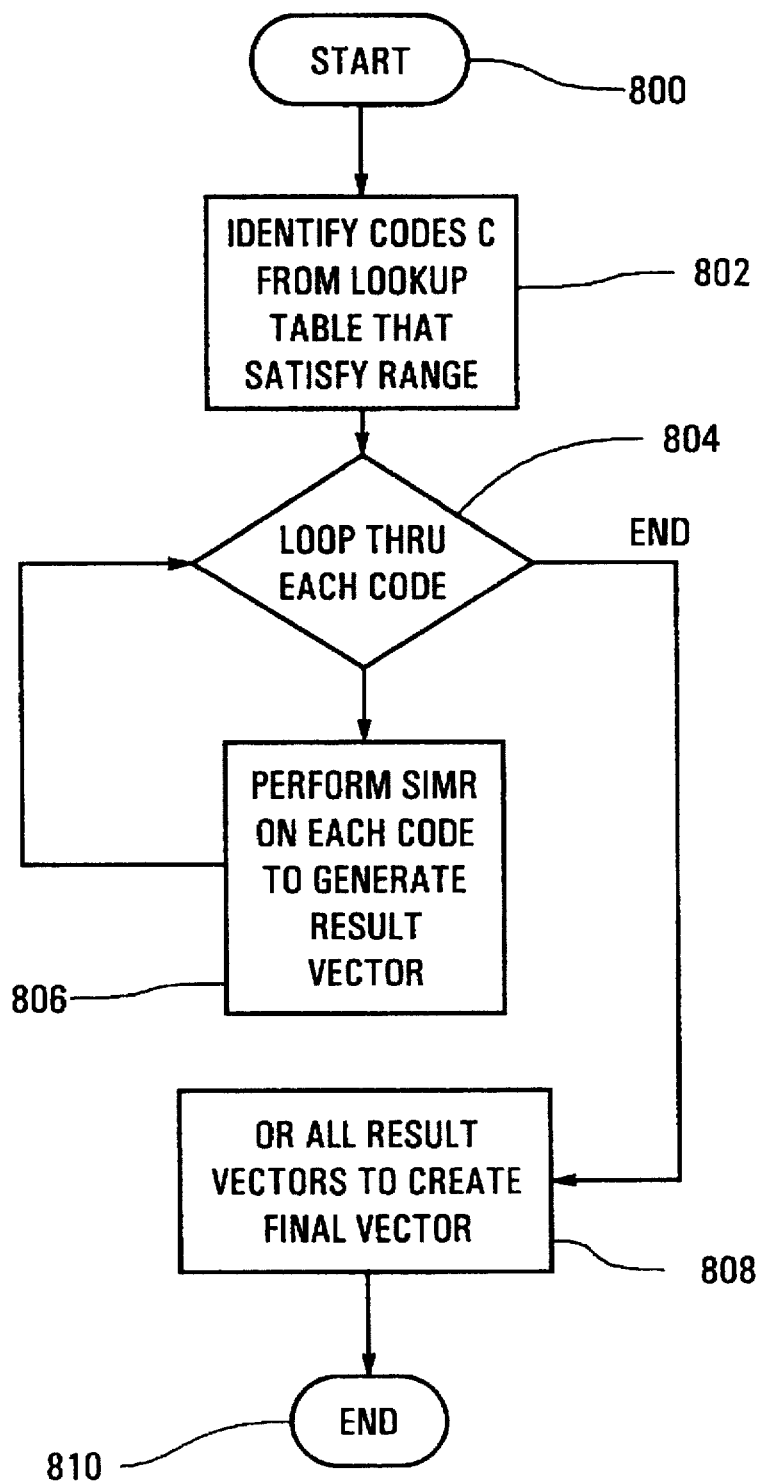
FIG. 8 is a flowchart illustrating the logic performed by the computer system in execute a range query on a single attribute using a vectorized index for the attribute according to the present invention.

FIG. 8 is a flowchart illustrating the logic performed by the computer system in execute a range query on a single attribute using an encoded vector index for the attribute according to the present invention. In this example, queries are performed that use a single inequality based (or range based) selection conditions of the form:

SELECT * FROM LINEITEM WHERE SHIPDATE>D1.

Block 800 represents the start of the logic. Block 802 represents the system identifying codes C from the lookup table for the index to identify all values therein that satisfy the range. For example, if there are M such values, then Block 802 will retrieve the codes corresponding to each of these M values. Block 804 is a decision block that represents the system performing a loop through each of the codes retrieved from the lookup table. Block 806 represents the system performing an SIMR on each code retrieved from the lookup table, i.e., for each value, to generate a result vector, wherein the set of result vectors is $V_1, \ldots, V_M$. After completion of the loop, control transfers to Block 808, which represents the system performing an OR operation on all the result vectors to create a final result vector. Control then transfers to Block 810 to end the logic.

A range query might be similarly executed by first identifying all the values from the active domain that fall in the range and then working with the codes for these values.

Note that the above logic seems like it requires M SIMR operations if there are M distinct values of interest in the query. However, this is seldom the case. Consider the following example. Assume that there are two 3-bit codes "001" and "000", and that a query is interested in tuples that have values with either of these codes. The query can be answered by representing the two codes more compactly as the single bit pattern 00x where x represents a "don't-care" bit. Thus, only one SIMR is needed to find rows with either value.

In general, if there is a natural order on the elements of the active domain, or if the values can be divided into groups that are often queried together, then codes can be assigned more intelligently. By using orthogonal codes, reflected grey codes, and other application-specific encoding techniques, ranges of values can be represented by fewer codes than the number of distinct values in the range.

Queries on hierarchies are efficiently supported by the ability to handle range and set queries. For example, by using orthogonal codes or reflected grey codes as described above, a group of values can be retrieved from the vectorized index using codes constructed using boolean minimization. Further, this group may represent a hierarchy, wherein the codes have been intelligently assigned so that a parent code can be identified from its child codes.

Join Queries

This section discusses how to equi-join two tables R and S on attributes R.A and R.S. Three methods are described and compared, without stating which is preferable. The choice hinges on many data-dependent factors and an analytical comparison is not possible.

First, it is assumed that the active domains of R.A and S.B are the same, and value V is assigned the same code in I(A) as in I(B). Subsequently, this assumption is removed and show that the schemes work even if the two active domains are different and even if values are assigned different codes in the two indices.

Hash Join

Figure 9:
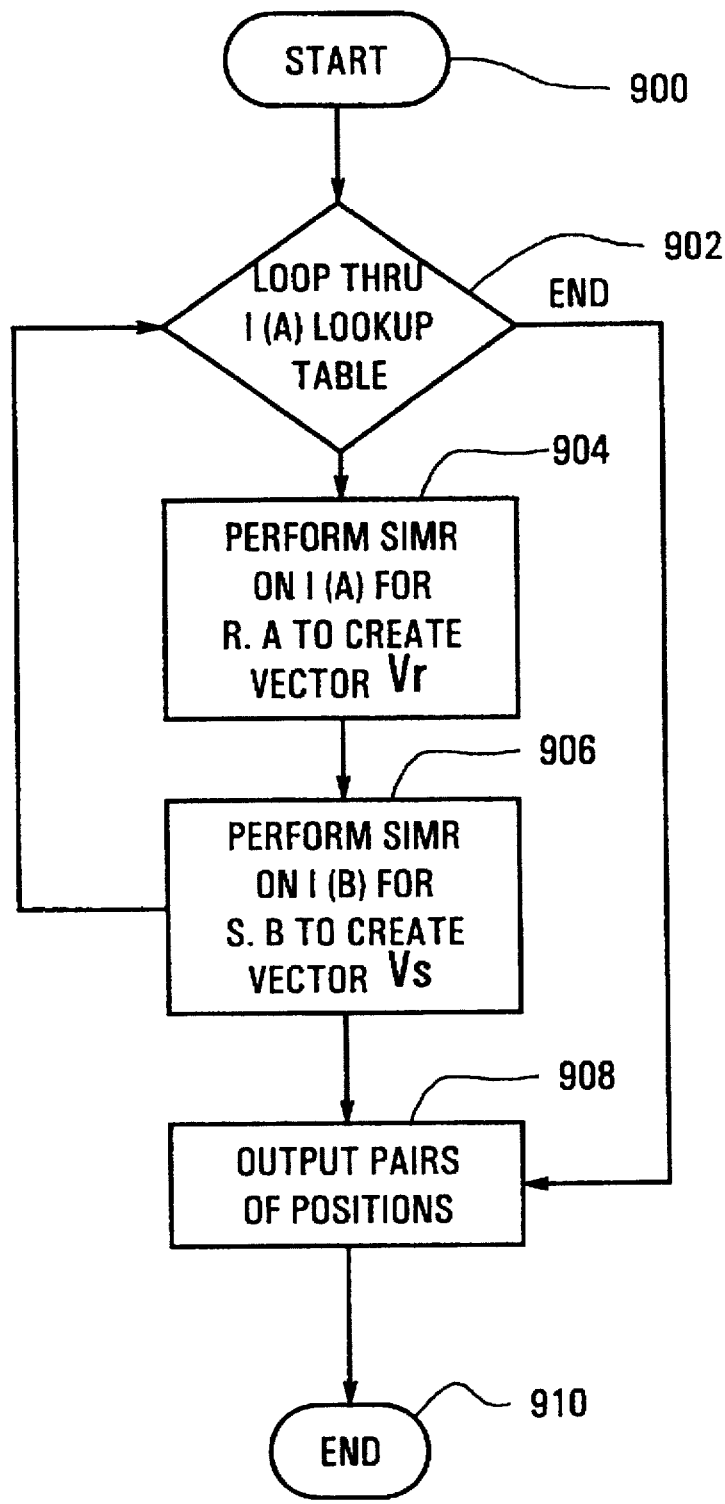
FIG. 9 is a flowchart illustrating the logic performed by the computer system to execute a hash join using a vectorized index according to the present invention.

FIG. 9 is a flowchart illustrating the logic performed by the computer system to execute a hash join using an encoded vector index according to the present invention. A hash join in the present invention is closely related to the hash join in standard relational databases. The output of the logic is a vector comprised of one or more pairs of bits positions, wherein the first position indicates a match with a tuple in R and the second position indicates a match with a joining tuple in S.

Block 900 represents the start of the logic. Block 902 represents the system performing a loop through the lookup table for the index I(A), wherein for each distinct value V in the lookup table there is a corresponding code C. Block 904 represents the system performing an SIMR using the code C on the index I(A) for R.A to create a result bit vector $V_R$. Block 906 represents the computer system performing an SIMR using the code C on the index I(B) for S.B to create a result bit vector $V_S$. After all the values have been processed, control then transfers to Block 908. Block 908 represents the system outputting a result vector comprised of one or more pairs of positions, wherein the first position corresponds to a 1 in $V_R$ and the second position corresponds to a 1 in $V_S$. Thereafter, control transfers to Block 910 to end the logic.

If the active domain of R.A is different from the active domain of S.B, then the above logic needs a little change. The consequence of different active domains is two-fold. Once, equi-joining on codes is not the same as equi-joining on values. Two, the code lengths may be different. However, the change needed to the algorithm is minor. For each V in the active domain of R.A, a lookup is performed for the code for V in both the lookup tables and the appropriate code is used in the SIMR operations. Note that values that occur in R.A and not in S.B are eliminated easily, because they will have codes in only one of the two tables.

Nested Loop Join

Figure 10:
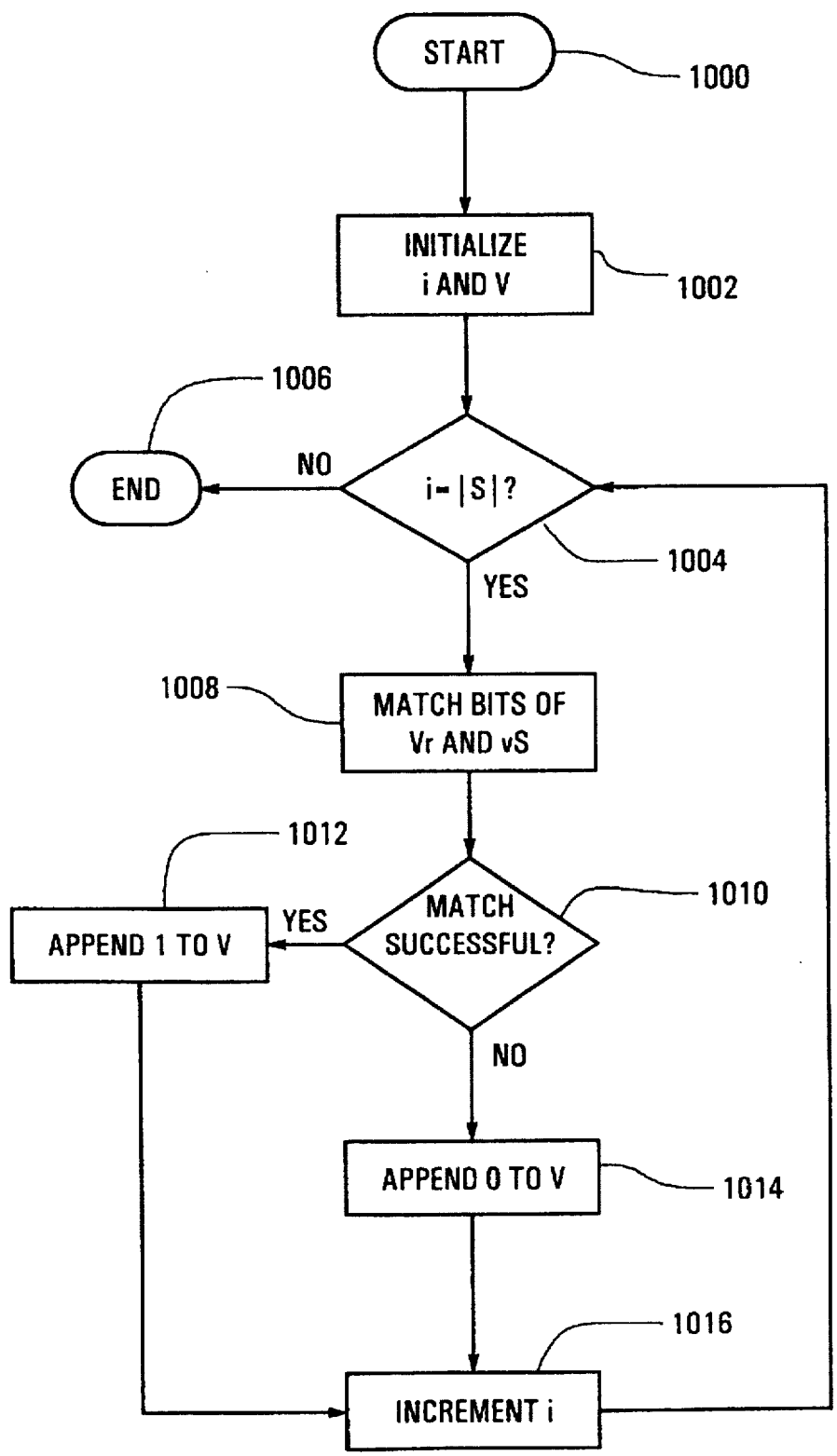
FIG. 10 is a flowchart illustrating the logic performed by the computer system to execute a nested loop join using a vectorized index for an attribute according to the present invention.

FIG. 10 is a flowchart illustrating the logic performed by the computer system to execute a nested loop join using an encoded vector index for an attribute according to the present invention. In the nested loop join of the present invention, a new basic operation called "Matching Unequal Bit-Vectors" (MUB) is defined, wherein the MUB operation assumes that both indices use the same codes for each distinct value. In the present invention, the nested loop join operation corresponds to joining R and S with the restriction that the Ith tuple of R can join only with the Ith tuple of S.

Block 1000 represents the start of the logic, wherein the input is a bit vector $V_R$ of size K*R and a bit vector $V_S$ of size K*S. Block 1002 represents the system initializing a variable I to 0 and an output vector V to empty. Block 1004 is a decision block that represents the system performing a loop until I is not equal to S, at which point control transfers to 1006 to end the logic; otherwise, control transfers to Block 1008. Block 1008 matches bits I*K to (I+1)*K of $V_R$ and $V_S$. Block 1010 is a decision block that represents the system determining if the match was successful. If so, control transfers to Block 1012, which represents the system appending A1 to vector V; otherwise control transfers to Block 1014, which represents the system appending a 0 to vector V. Block 1016 increments the variable I by 1. When the logic ends, the vector V is of length S bits, wherein the Ith bit is '1' if the Ith block of K bits of $V_R$ and $V_S$ are the same.

Matching Unequal Bit Vectors (MUB)—First Embodiment

Figure 11:
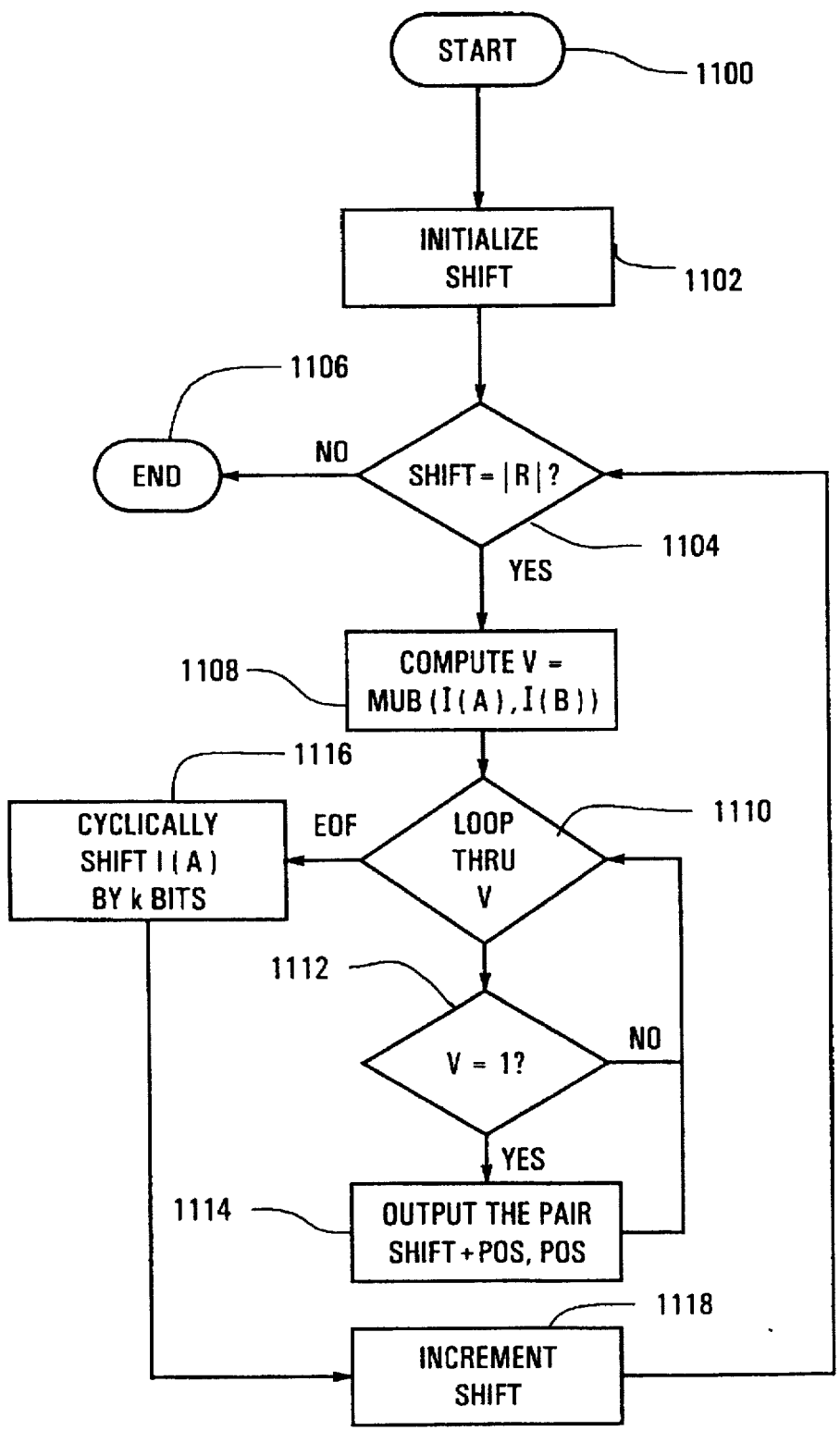
FIG. 11 is a flowchart illustrating the logic performed by the computer system to execute a MUB operation using a vectorized index for an attribute according to the present invention.

FIG. 11 is a flowchart illustrating the logic performed by the computer system in a first embodiment to execute a MUB operation using an encoded vector index for an attribute according to the present invention. The matching operation in MUB($V_R$,$V_S$) is defined as in SIMR.

Block 1100 represents the start of the logic, wherein the input comprises encoded vector indices I(R.A) and I(R.B). Block 1102 represents initializing the variable SHIFT to 0. Block 1104 is a decision block that represents the system performing a loop until the variable SHIFT is not equal to |R|, at which point control transfers to 1106 to end the logic, wherein the output is a set of pairs of positions for the joining tuples. Block 1108 represents the system computing V=MUB. Block 1110 is a decision block that represents the system looping through the vector V. For every bit in the vector V, Block 1112 represents the system performing a test to determine if the bit is a 1. If so, control transfers to Block 1114 which represents the system outputting the pair (SHIFT+POS). POS. Upon completion of the loop through V, Block 1116 represents the system cyclically shifting the encoded index I(A) by K bits. Block 1118 represents the system incrementing the variable SHIFT by 1.

Intuitively, the above logic joins indices I(R.A) and I(S.B), such that a tuple in R joins with a tuple in S only if both tuples are in the same position. This operation is repeated after shifting I(R.A) by K bits, so that the order of tuples in R is changed. Thus, different joining tuples are obtained in R and S. The shift is repeated as many times as there are tuples in R, so that all possible combinations of the tuples of R and S are explored.

Matching Unequal Bit Vectors (MUB)—Second Embodiment

Now, consider the case when the relations may have different active domains. The MUB routine has to be modified because the two vectors may have different code assignments and probably even different code lengths, whereas previously a block of K bits represented the same value in both vectors.

Figure 12:
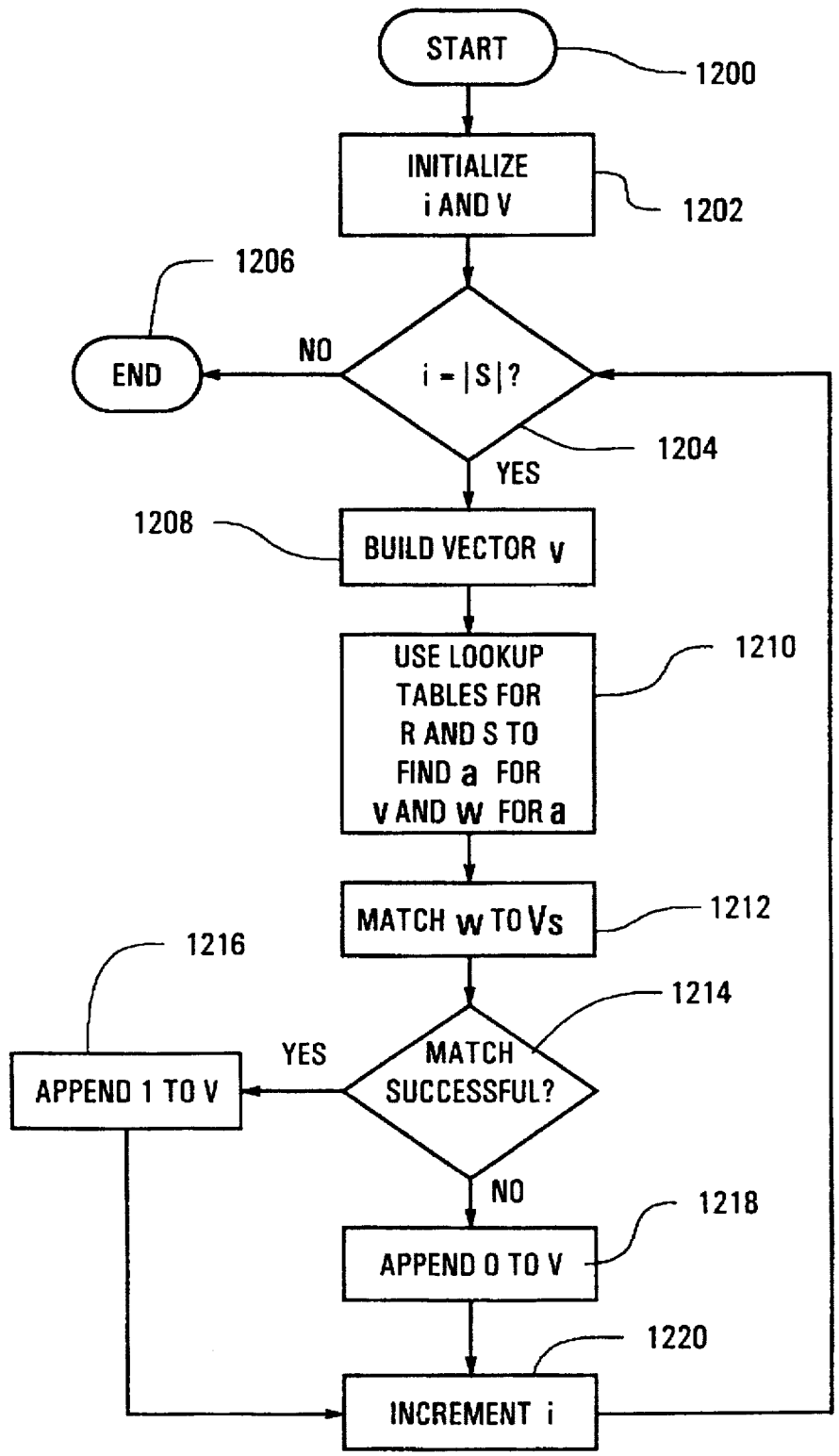
FIG. 12 is a flowchart illustrating the logic performed by the computer system to execute the MUB function using a vectorized index for an attribute according to the present invention.

FIG. 12 is a flowchart illustrating the logic performed by the computer system to execute the MUB function using an encoded vector index for an attribute according to the present invention. Block 1200 represents the start of the logic, wherein the input comprises a bit vector $V_R$ and a bit vector $V_S$. Block 1202 represents the system initializing the variable I to 0 and the vector V to empty. Block 1204 is a decision block that represents the system performing a loop until I is not equal to S. Thereafter, control transfers to Block 1206, wherein the output is a vector V of S bits such that the Ith bit is 1 if the Ith block of K bits of $V_R$ is the same as the Ith block of K bits of $V_S$; otherwise control transfers to Block 1208. Block 1208 represents the system building the vector V using bits I*K (I+1)*K of $V_R$. Block 1210 represents the system using the lookup table for R to find the main value A corresponding to code V and using the lookup table for S to find the code W for the main value. Block 1212 represents the system matching W with bits I*K to (I+1)*K of $V_S$. Block 1214 is a decision block that represents the system determining whether or not the match was successful. If so, control transfers to Block 1216 which appends a 1 to V; otherwise control transfers to Block 1218 which appends a 0 to V. Block 1220 increments the variable I by 1.

Sort Merge Join

In the context of the sort merge join, if the two indices use different codes, then the order on the two sets of codes may correspond to different orders of the underlying values. Thus, one alternative is to sort only one of the two indices and for each value in the unsorted index, the sorted index is scanned until the matching value is found. Additionally, sorting an index destroys the position information that each code in the index carries. Thus, the code for the first tuple may now occur much later in the sorted index because the sort order will not preserve the table order. The solution then is to associate with each code a set of positions in which it appears. This information can be kept in another lookup table and the positions used while generating the final answer.

Figure 13:
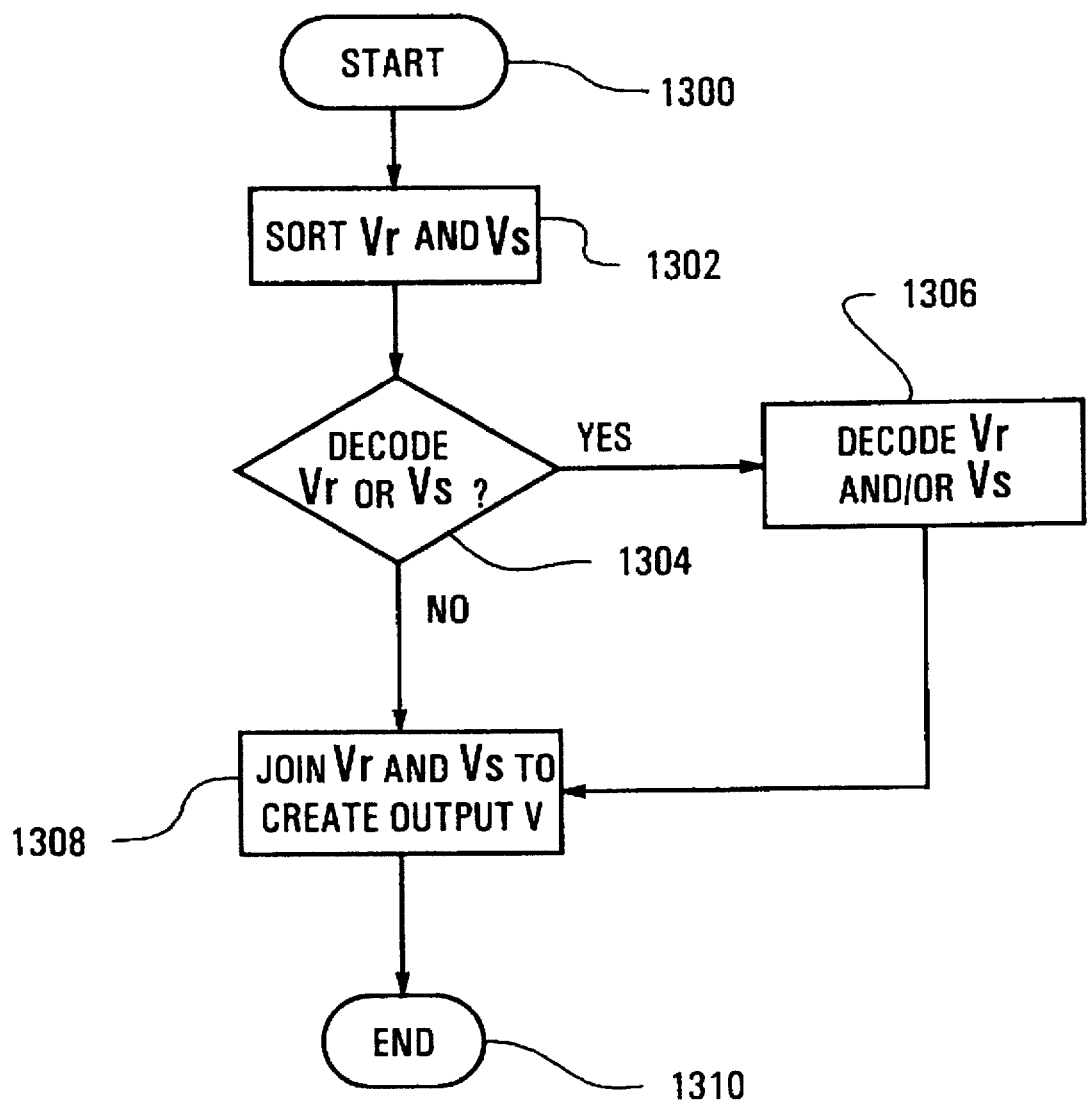
FIG. 13 is a flowchart illustrating the logic performed by the computer system to execute a sort merge join using a vectorized index for an attribute according to the present invention.

FIG. 13 is a flowchart illustrating the logic performed by the computer system to execute a sort merge join using a vectorized index for an attribute according to the present invention. Block 1300 represents the start of the logic, wherein the input comprises a bit vector $V_R$ and a bit vector $V_S$. Block 1302 represents the system sorting both bit vector $V_R$ and a bit vector $V_S$. Block 1304 is a decision block that represents the system determining whether to decode bit vector $V_R$ and/or a bit vector $V_S$, so that both vectors use the same encoding values. If so, control is transferred to Block 1306 to decode bit vector $V_R$ and/or a bit vector $V_S$, as required. Thereafter, control transfers to Block 1308, which represents the system performing a join operation on bit vector $V_R$ and bit vector $V_S$. Control then transfers to Block 1310 to end the logic, wherein the output comprises a result vector V.

Comparison of Join Costs

First, some notations are listed:

Cost of comparing two vectors of length A and B is c(A,B). Output is length a assuming A<=B.

Cost of matching a vector of length K*A with a code of length K in A chunks of length K is m(K,A). Output is of length K*A.

Cost of reducing chunks of length K into single bits, in a vector of length K+A is r(K,A). Output is of length A.

Cost of reducing chunks of length K into single bits, in a vector of length K*A is r(K,A). Output is of length A.

Cost of accessing the code lookup table with A values is l(A). The same cost may be assumed whether the logic using the code or using the value.

Intuitively, c(K,A)<=r(K,A)<=m(K,A). The same exact numbers will help determine which method performs better.

In a Hash Join, the loop is repeated for each distinct value, making D the multiplication factor. The value is found by accessing the lookup table for R, making the cost l(|R|), i.e., it should be less because the access is not a lookup but a sequential scan. The value is used to find its code in I(S.B) incurring a cost of l(|S|). The cost of the SIMR operations on R is m(K, |R|+r(K,A)). Thus, the total cost of the join is:

$$D*\{l(|R|)+(l(|S|)+m(K,|R|)+r(K,|R|)+m(K',|S|)+r(K',|S|)\}$$

In a Nested Loop Join, the outer loop is repeated |R| times, making |R| a multiplicative factor. The loop involves computing MUB for the two bit-vectors I(R.A) and I(S.B) (possibly with shifting). Assume zero cost for shifting, because a shift may not actually be needed. The MUB operation has the following cost: for each chunk of K bits in I(R.A), the lookup table for R is used to find the value V, and for V the code in S is looked up. Assume that the cost of matching I(S.B) with |S| chunks of K' bits is the same as matching it with repeatedly with one chunk of K' bits. Thus, the cost of the MUB operation is:

$1(|RI)+1(|SI)+m(K',|SI)+r(K',|SI)$ thereby making the cost of the join:

$|RI*\{1(|RI)+1(|SI)+m(K',|SI)+r(K',|SI)\}$

Processing of GROUP BY and ORDER BY

The methods similar to the methods proposed for joins can be employed to process GROUP BY and ORDER BY statements. Namely, GROUP BY and ORDER BY can be performed by employing one of the following methods.

"Hash" based GROUP/ORDER BY: In this method, a hash bucket is assigned to each member of active domain and then the encoded vectorized index is linearly scanned in order to hash each tuple to the right bucket.

Merge sort based GROUP/ORDER BY: In this method, the encoded vectorized index is sorted on the codes or members of the active domain and then, in case of GROUP BY, tuples are grouped together that contain similar codes/members.

Indexed based GROUP/ORDER BY: Similar to the conventional index methods, the encoded vectorized indices are linearly scanned according to ordering implied by the codes or members of the active domain.

Similar to joins, the cost of the above method depends on a number of different factors such as the cardinality of the active domain, size of the encoded vectorized index, size of the main memory, CPU, etc. A detailed cost model can be generated for each of these method and, depending upon the cost, the optimal method can be selected for a given query.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and article of manufacture for optimizing SQL queries in a relational database management system using encoded vectorized indices. The use of encoded vectorized indices efficiently support the requirements imposed by applications such as data warehousing. Moreover, the present invention is very amenable for constructing static and dynamic hierarchies, joins, pre-aggregation, etc. The present invention also has the same functionality as any other conventional index method. Thus, other issues such as index recovery, compression of indices, etc., and algorithms for these issues are also applicable to the new proposed method.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing an SQL query in a computer having a memory, the SQL query being performed by the computer to retrieve data from a relational database stored in the memory, the relational database comprising one or more tables of data, each of the tables comprising one or more intersecting rows and columns of data, the method comprising the steps of:

(a) storing a vectorized index in the memory of the computer for values in one or more of the columns of a particular table in the relational database, wherein the vectorized index comprises a plurality of positions, and each of the positions comprises a linear array that represents a value for the specified columns in a corresponding row of the particular table in the relational database; and (b) performing the query in the memory of the computer using the stored vectorized index.

2. The method of claim 1, wherein an active domain for the vectorized index comprises a set of all distinct values of the specified columns that occur in the particular table.

3. The method of claim 1, wherein the storing step further comprises the step of modifying the vectorized index using a function selected from a group comprising an insertion function, a deletion function, and a modification function.

4. The method of claim 1, wherein the performing step comprises the step of converting the query into a series of vector operations, wherein a result of the vector operations is a list of the positions in the vectorized index.

5. The method of claim 1, wherein the query is selected from a group comprising a point query on a single column, a point query on multiple columns, a range query on a single column, a join query, a hash join query, a nested loop join query, and a sort merge join query.

6. The method of claim 5, wherein the point query on a single column, the point query on multiple columns, and the range query on a single column, each comprise the steps of:

(1) examining, in the computer, each of the positions in the vectorized index that represent a value in the specified columns;

(2) determining, in the computer, whether the examined positions meet selection criteria for the value in the specified columns as specified in the point query; and (3) generating, in the computer, a signal that represents a result from the determining step.

7. The method of claim 6, wherein the signal is a vector.

8. The method of claim 5, wherein the join query and the hash join query each comprise the steps of:

(1) retrieving, in the computer, a value from the active domain for a first vectorized index of a first table;

(2) examining, in the computer, positions in the first vectorized index that represent a value in one or more columns of the first table;

(3) determining, in the computer, whether the examined positions from step (2) match the retrieved value from step (1);

(4) generating, in the computer, a first signal that represents a result from the determining step (3); and (5) examining, in the computer, positions from a second vectorized index that represent a value in one or more columns of a second table;

(6) determining, in the computer, whether the examined positions from step (5) match the retrieved value from step (1);

(7) generating, in the computer, a second signal that represents a result from the determining step (6); and (8) repeating steps (1)–(8) for all values in the active domain.

9. The method of claim 8, wherein the first and second signals are vectors.

10. The method of claim 9, further comprising the step of combining the first and second vectors into a result vector.

11. The method of claim 10, wherein the result vector comprises one or more pairs of values such that a first one of the values indicates whether a row in the first table matches the retrieved value and a second one of the values indicates that a corresponding row in the second table matches the retrieved value.

12. The method of claim 11, further comprising the step of joining a row from the first table to a row from the second table when a corresponding pair of values in the result vector indicates that both rows match the retrieved value.

13. The method of claim 8, further comprising the step of matching unequal vectors for the first and second tables.

14. The method of claim 5, wherein the nested loop join comprises the steps of:
   (1) examining, in the computer, position from a first vectorized index that represent a value in one or more columns of a first table;
   (2) examining, in the computer, positions from a second vectorized index that represent a value in one or more columns of a second table;
   (3) determining, in the computer, whether the examined positions from step (1) matches the examined positions from step (2);
   (4) generating, in the computer, a signal that represents a result from the determining step (3).

15. The method of claim 14, wherein the signal is a vector.

16. The method of claim 1, wherein the vectorized index comprises a vector of |R|*K bits, |R| is a count of rows in the particular table, K is equal to CEILING(LOG(N)), N is a count of unique values in an active domain for the specified columns, CEILING() is a ceiling function that returns a next highest integer value for LOG(N), and each respective K bits from the encoded vector index represent a value for the specified column in a corresponding row of the particular table.

17. The method of claim 16, wherein the active domain is a set of all distinct values of the specified columns that occur in the particular table.

18. The method of claim 17, further comprising the step of mapping each distinct value in the set to a unique K-bit code representing that value.

19. The method of claim 1, wherein each of the linear arrays comprise a reflected grey code.

20. The method of claim 19, wherein the performing step comprises the step of retrieving a group of values from the vectorized index using codes constructed using boolean minimization.

21. The method of claim 20, wherein the group comprises a hierarchy.

22. The method of claim 20, wherein the codes are intelligently assigned so that a parent code can be identified from its child codes.

23. An apparatus for optimizing an SQL query, comprising:
   (a) a computer having a memory and a data storage device coupled thereto, wherein the data storage device stores a relational database, the relational database comprising one or more tables of data, each of the tables comprising one or more intersecting rows and columns of data;
   (b) means, performed by the computer, for storing a vectorized index in the memory of the computer for values in one or more of the columns of a particular table in the relational database, wherein the vectorized index comprises a plurality of positions, and each of the positions comprises a linear array that represents a value for the specified columns in a corresponding row of the particular table in the relational database; and
   (c) means, performed by the computer, for executing the query in the memory of the computer using the stored vectorized index.

24. A program storage medium readable by a computer having a memory, the medium tangibly embodying one or more programs of instructions executable by the computer to perform method steps for optimizing an SQL query, the SQL query being performed by the computer to retrieve data from a relational database stored in an data storage device coupled to the computer, the relational database comprising one or more tables of data, each of the tables comprising one or more intersecting rows and columns of data the method comprising the steps of:
   (a) storing a vectorized index in the memory of the computer for values in one or more of the columns of a particular table in the relational database, wherein the vectorized index comprises a plurality of positions, and each of the positions comprises a linear array that represents a value for the specified columns in a corresponding row of the particular table in the relational database; and
   (b) performing the query in the memory of the computer using the stored vectorized index.

25. A memory for storing data for access by an SQL query executed by a computer, the SQL query being performed by the computer to retrieve data from a relational database stored in the computer, the relational database comprising one or more tables of data, each of the tables comprising one or more intersecting rows and columns of data, the memory comprising:
   a vectorized index representative of values in one or more of the columns of a particular table in the relational database, wherein the vectorized index comprises a plurality of positions, and each of the positions comprises a linear array that represents a value for the specified columns in a corresponding row of the particular table in the relational database.

26. The apparatus of claim 23, wherein an active domain for the vectorized index comprises a set of all distinct values of the specified columns that occur in the particular table.

27. The apparatus of claim 23, wherein the means for storing further comprises means for modifying the vectorized index using a function selected from a group comprising an insertion function, a deletion function, and a modification function.

28. The apparatus of claim 23, wherein the means for executing comprises means for converting the query into a series of vector operations, wherein a result of the vector operations is a list of the positions in the vectorized index.

29. The apparatus of claim 23, wherein the query is selected from a group comprising a point query on a single column, a point query on multiple columns, a range query on a single column, a join query, a hash join query, a nested loop join query, and a sort merge join query.

30. The apparatus of claim 29, wherein the point query on a single column, the point query on multiple columns, and the range query on a single column, each comprise:
   (1) means for examining, in the computer, each of the positions in the vectorized index that represent a value in the specified columns;
   (2) means for determining, in the computer, whether the examined positions meet selection criteria for the value in the specified columns as specified in the point query; and

19

(3) means for generating, in the computer, a signal that represents a result from the means for determining.

31. The apparatus of claim 30, wherein the signal is a vector.

32. The apparatus of claim 29, wherein the join query and the hash join query each comprise:
   (1) means for retrieving, in the computer, a value from the active domain for a first vectorized index of a first table;
   (2) means for examining, in the computer, positions in the first vectorized index that represent a value in one or more columns of the first table;
   (3) means for determining, in the computer, whether the examined positions from the means for examining (2) match the retrieved value from the means for retrieving (1);
   (4) means for generating, in the computer, a first signal that represents a result from the means for determining (3); and
   (5) means for examining, in the computer, positions from a second vectorized index that represent a value in one or more columns of a second table;
   (6) means for determining, in the computer, whether the examined positions from the means for examining (5) match the retrieved value from the means for retrieving (1);
   (7) means for generating, in the computer, a second signal that represents a result from the means for determining (6); and
   (8) means for performing the means (1)–(8) for all values in the active domain.

33. The apparatus of claim 32, wherein the first and second signals are vectors.

34. The apparatus of claim 33, further comprising means for combining the first and second vectors into a result vector.

35. The apparatus of claim 34, wherein the result vector comprises one or more pairs of values such that a first one of the values indicates whether a row in the first table matches the retrieved value and a second one of the values indicates that a corresponding row in the second table matches the retrieved value.

36. The apparatus of claim 35, further comprising means for joining a row from the first table to a row from the second table when a corresponding pair of values in the result vector indicates that both rows match the retrieved value.

37. The apparatus of claim 32, further comprising means for matching unequal vectors for the first and second tables.

38. The apparatus of claim 29, wherein the nested loop join comprises:
   (1) means for examining, in the computer, positions from a first vectorized index that represent a value in one or more columns of a first table;
   (2) means for examining, in the computer, positions from a second vectorized index that represent a value in one or more columns of a second table;
   (3) means for determining, in the computer, whether the examined positions from the means for examining (1) matches the examined positions from the means for examining (2);
   (4) means for generating, in the computer, a signal that represents a result from the means for determining (3).

39. The apparatus of claim 38, wherein the signal is a vector.

40. The apparatus of claim 23, wherein the vectorized index comprises a vector of |R|*K Bits, |R| is a count of rows in the particular table, K is equal to CEILING(LOG(N)), N is a count of unique values in an active domain for the specified columns, CEILING() is a ceiling function that returns a next highest integer value for LOG(N), and each respective K bits from the encoded vector index represent a value for the specified column in a corresponding row of the particular table.

41. The apparatus of claim 40, wherein the active domain is a set of all distinct values of the specified columns that occur in the particular table.

42. The apparatus of claim 41, further comprising means for mapping each distinct value in the set to a unique K-bit code representing that value.

43. The apparatus of claim 23, wherein each of the linear arrays comprise a reflected grey code.

44. The apparatus of claim 43, wherein the means for executing comprises means for retrieving a group of values from the vectorized index using codes constructed using boolean minimization.

45. The apparatus of claim 44, wherein the group comprises a hierarchy.

46. The apparatus of claim 44, wherein the codes are intelligently assigned so that a parent code can be identified from its child codes.

47. The method of claim 24, wherein an active domain for the vectorized index comprises a set of all distinct values of the specified columns that occur in the particular table.

48. The method of claim 24, wherein the storing step further comprises the step of modifying the vectorized index using a function selected from a group comprising an insertion function, a deletion function, and a modification function.

49. The method of claim 24, wherein the performing step comprises the step of converting the query into a series of vector operations, wherein a result of the vector operations is a list of the positions in the vectorized index.

50. The method of claim 24, wherein the query is selected from a group comprising a point query on a single column, a point query on multiple columns, a range query on a single column, a join query, a hash join query, a nested loop join query, and a sort merge join query.

51. The method of claim 50, wherein the point query on a single column, the point query on multiple columns, and the range query on a single column, each comprise the steps of:
   (1) examining, in the computer, each of the positions in the vectorized index that represent a value in the specified columns;
   (2) determining, in the computer, whether the examined positions meet selection criteria for the value in the specified columns as specified in the point query; and
   (3) generating, in the computer, a signal that represents a result from the determining step.

52. The method of claim 51, wherein the signal is a vector.

53. The method of claim 50, wherein the join query and the hash join query each comprise the steps of:
   (1) retrieving, in the computer, a value from the active domain for a first vectorized index of a first table;
   (2) examining, in the computer, positions in the first vectorized index that represent a value in one or more columns of the first table;
   (3) determining, in the computer, whether the examined positions from step (2) match the retrieved value from step (1);
   (4) generating, in the computer, a first signal that represents a result from the determining step (3); and (5) examining, in the computer, positions from a second vectorized index that represent a value in one or more columns of a second table;

(6) determining, in the computer, whether the examined positions from step (5) match the retrieved value from step (1);

(7) generating, in the computer, a second signal that represents a result from the determining step (6); and (8) repeating steps (1)–(8) for all values in the active domain.

54. The method of claim 53, wherein the first and second signals are vectors.

55. The method of claim 54, further comprising the step of combining the first and second vectors into a result vector.

56. The method of claim 55, wherein the result vector comprises one or more pairs of values such that a first one of the values indicates whether a row in the first table matches the retrieved value and a second one of the values indicates that a corresponding row in the second table matches the retrieved value.

57. The method of claim 56, further comprising the step of joining a row from the first table to a row from the second table when a corresponding pair of values in the result vector indicates that both rows match the retrieved value.

58. The method of claim 53, further comprising the step of matching unequal vectors for the first and second tables.

59. The method of claim 50, wherein the nested loop join comprises the steps of:

(1) examining, in the computer, positions from a first vectorized index that represent a value in one or more columns of a first table;

(2) examining, in the computer, positions from a second vectorized index that represent a value in one or more columns of a second table;

(3) determining, in the computer, whether the examined positions from step (1) matches the examined positions from step (2);

(4) generating, in the computer, a signal that represents a result from the determining step (3).

60. The method of claim 59, wherein the signal is a vector.

61. The method of claim 24, wherein the vectorized index comprises a vector of |R|*K bits, |R| is a count of rows in the particular table, K is equal to CEILING(LOG(N)), N is a count of unique values in an active domain for the specified columns, CEILING() is a ceiling function that returns a next highest integer value for LOG(N), and each respective K bits from the encoded vector index represent a value for the specified column in a corresponding row of the particular table.

62. The method of claim 61, wherein the active domain is a set of all distinct values of the specified columns that occur in the particular table.

63. The method of claim 62, further comprising the step of mapping each distinct value in the set to a unique K-bit code representing that value.

64. The method of claim 24, wherein each of the linear arrays comprise a reflected grey code.

65. The method of claim 64, wherein the performing step comprises the step of retrieving a group of values from the vectorized index using codes constructed using boolean minimization.

66. The method of claim 65, wherein the group comprises a hierarchy.

67. The method of claim 65, wherein the codes are intelligently assigned so that a parent code can be identified from its child codes.

68. The memory of claim 25, wherein an active domain for the vectorized index comprises a set of all distinct values of the specified columns that occur in the particular table.

69. The memory of claim 25, wherein the vectorized index comprises a vector of |R|*K bits, |R| is a count of rows in the particular table, K is equal to CEILING(LOG(N)), N is a count of unique values in an active domain for the specified columns, CEILING() is a ceiling function that returns a next highest integer value for LOG(N), and each respective K bits from the encoded vector index represent a value for the specified column in a corresponding row of the particular table.

70. The memory of claim 69, wherein the active domain is a set of all distinct values of the specified columns that occur in the particular table.

71. The memory of claim 70, wherein each distinct value in the set maps to a unique K-bit code representing that value.

72. The memory of claim 25, wherein each of the linear arrays comprise a reflected grey code.

* * * * *

UNITED STATES PATENT AND TRADEMARK OFFICE
CERTIFICATE OF CORRECTION

PATENT NO. : 5,706,495

DATED : January 6, 1998

INVENTOR(S) : Atul Chadha, et al.

It is certified that error appears in the above-identified patent and that said Letters Patent is hereby corrected as shown below:

Column 2, lines 46 and 47 "the there" should read ---their---

Column 5, line 32 after the word "is" insert ---an---

Column 15, line 29 "method" should read ---methods---

Signed and Sealed this

Twelfth Day of January, 1999

*Attest:*

*Attesting Officer*      *Acting Commissioner of Patents and Trademarks*